(12) United States Patent
Meadows

(10) Patent No.: US 7,995,558 B1
(45) Date of Patent: Aug. 9, 2011

(54) ASSOCIATION OF DIGITAL COMMUNICATION NETWORK CUSTOMERS WITH NETWORK SIGNALING TUNNELS

(75) Inventor: Garry J. Meadows, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 761 days.

(21) Appl. No.: 11/349,799

(22) Filed: Feb. 8, 2006

(51) Int. Cl.
H04L 12/66 (2006.01)

(52) U.S. Cl. ........ 370/352; 370/241; 370/235; 370/351; 455/454; 455/445

(58) Field of Classification Search .................. 370/352, 370/241, 230, 235, 270, 276, 88.19, 351, 370/401, 356; 455/454, 445, 422; 709/206, 709/223, 238
See application file for complete search history.

(56) References Cited

U.S. PATENT DOCUMENTS

| | | | | |
|---|---|---|---|---|
| 6,137,791 A | * | 10/2000 | Frid et al. ....................... | 370/352 |
| 2003/0083988 A1 | * | 5/2003 | Reith .............................. | 705/40 |
| 2003/0093563 A1 | * | 5/2003 | Young et al. ................... | 709/245 |
| 2003/0177099 A1 | * | 9/2003 | Gallant et al. .................. | 705/52 |
| 2004/0037219 A1 | * | 2/2004 | Shaffer et al. ................. | 370/217 |
| 2004/0044789 A1 | * | 3/2004 | Angel et al. ................... | 709/238 |
| 2005/0094623 A1 | * | 5/2005 | D'Eletto ........................ | 370/352 |
| 2005/0195745 A1 | * | 9/2005 | Scott et al. .................... | 370/241 |
| 2007/0110072 A1 | * | 5/2007 | Elias ........................... | 370/395.5 |
| 2007/0189219 A1 | * | 8/2007 | Navali et al. .................. | 370/331 |
| 2008/0225901 A1 | * | 9/2008 | Gerszberg et al. ............ | 370/535 |

\* cited by examiner

Primary Examiner — Pankaj Kumar
Assistant Examiner — Anez Ebrahim

(57) ABSTRACT

A communication system is provided which includes a digital communication network having a network endpoint and a signaling server. The network endpoint is coupled with the signaling server by way of signaling tunnels through the digital communication network. A first of the signaling tunnels is defined by a first network address for the network endpoint and a second network address for the signaling server. Also, the network endpoint is configured to aggregate signaling associated exclusively with a customer over the first signaling tunnel, and the signaling server is configured to associate the customer with the first signaling tunnel.

28 Claims, 6 Drawing Sheets

ASSOCIATION OF DIGITAL COMMUNICATION NETWORK CUSTOMERS WITH NETWORK SIGNALING TUNNELS

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to digital communication networks, and more particularly to association of digital communication network customers with a network signaling tunnel.

2. Description of the Prior Art

The Internet has become a well-known and readily-accepted source of a plethora of information, from simple written documents and photographic images, to various forms of multimedia, for government, commercial, and retail customers alike. In addition, the Internet has more recently held the promise of real-time voice communication, the use of which may be less expensive than the typical phone service provided by a Public Switched Telephone Network (PSTN).

However, PSTNs, by virtue of providing phone service for many decades, have already generated well-tested solutions to various challenges inherent in voice communication services. Many of these challenges are not associated with the delivery of the service itself, but instead involve more peripherally-oriented tasks, such as billing and security. Accordingly, Internet-based voice communication networks, such as those employing Voice-over-Internet-Protocol (VoIP), may lag behind PSTNs in providing such functionality in a robust manner due to the corresponding technology being relatively new.

For example, with respect to billing large customers, PSTNs normally acquire information from switches within the network to determine which customer is to be billed, and for what amount, for each phone call utilizing the network. FIG. 1 is a simplified block diagram of a portion of a PSTN 1 employing a switch 2 for switching multiple time-domain-multiplexed (TDM) trunk groups 4 connected to customers 6a, 6b and 6c onto the remainder of the PSTN 1. Also, a billing system 8 is coupled with the switch 2, as well as other switches and components of the PSTN 1, to gather information regarding the phone calls passing through the PSTN 1 to generate bills for phone service usage. Typically, since each of the customers 6 may be associated with one or more of the trunk groups 4, which serve as bearer channels for the actual voice data being transmitted across the PSTN 1, the billing system 8 may identify each customer 6 by way of information from the switch 2 indicating the identity of the switch 2 and the trunk group 4 carrying the particular call or group of calls to be billed. Also, the switch 2 may supply a duration of the call to allow the billing system 8 to determine how much to bill the customer 6.

Identifying a large customer by way of circuit connections is a somewhat natural consequence of PSTNs employing circuit-switching to connect one customer to another. However, due to the general packet-switching nature of the Internet, however, other methods that provide efficient and secure billing processes are likely required. In addition, various security threats, such as theft of service, IP address spoofing, and other techniques closely associated with the Internet, impart additional incentive to provide secure billing and similar functions associated with Internet phone service.

SUMMARY OF THE INVENTION

One embodiment of the invention, described below, provides a communication system which includes a digital communication network having a network endpoint and a signaling server, wherein the network endpoint is coupled with the signaling server via signaling tunnels through the digital communication network. A first of the signaling tunnels is defined by a first network address for the network endpoint and a second network address for the signaling server. The network endpoint is configured to aggregate signaling associated exclusively with a customer over the first signaling tunnel, and the signaling server is configured to associate the customer with the first signaling tunnel.

Another embodiment provides a signaling server for a communication system which includes an interface and a processor. The interface is configured to couple the signaling server with a network endpoint via signaling tunnels through the digital communication network, wherein a first of the signaling tunnels is defined by a first network address for the network endpoint and a second network address for the signaling server. Also, the network endpoint is configured to aggregate signaling associated exclusively with a customer over the first signaling tunnel. The processor is configured to associate the customer with the first signaling tunnel.

Further, another embodiment of the invention provides a method for identifying a customer of a digital communication network. A network endpoint is coupled with a signaling server over signaling tunnels through the digital network. A first of the signaling tunnels is defined by a first network address for the network endpoint and a second network address for the signaling server. Signaling associated exclusively with a customer is aggregated over the first signaling tunnel. The customer is then associated with the first signaling tunnel.

Additional embodiments and advantages of the present invention will be ascertained by those skilled in the art upon perusal of the following detailed description, taken in conjunction with the accompanying drawings.

DETAILED DESCRIPTION OF THE INVENTION

Figure 1:
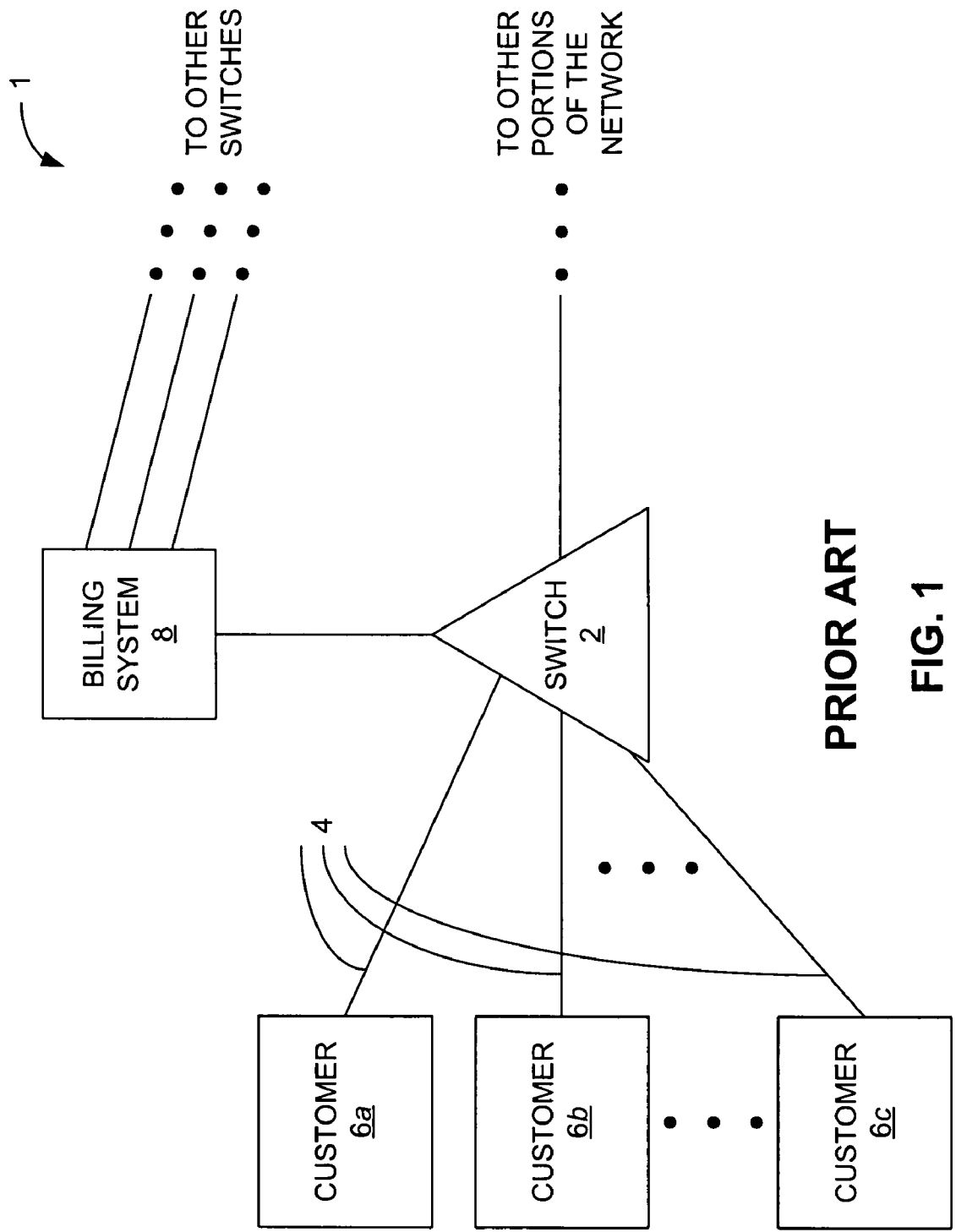
FIG. 1 is a simplified block diagram of a portion of a Public Switched Telephone Network from the prior art.
Figure 2:
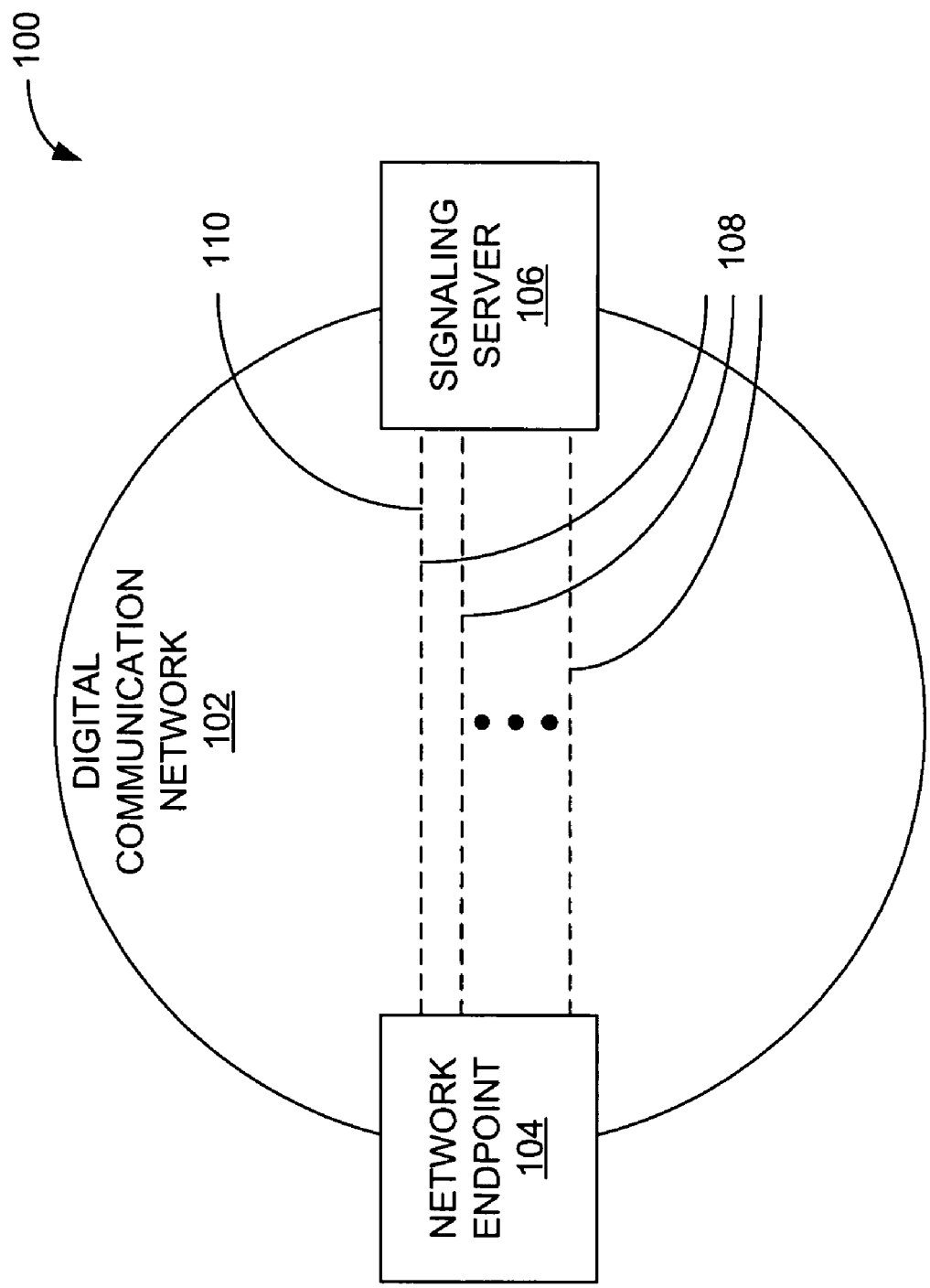
FIG. 2 is a simplified block diagram of a communication system including a digital communication network according to an embodiment of the invention.

One embodiment of the invention, a communication system 100, is shown in the simplified block diagram of FIG. 2. The system 100 includes a digital communication network 102 having a network endpoint 104 and a signaling server 106. The network endpoint 104 provides a point of presence on the digital communication network 102 for customers utilizing the network 102. The network endpoint 104 is coupled with the signaling server 106 via signaling tunnels 108 through the digital communication network 102. By way of this signaling, the signaling server 6 sets up communication sessions between the network endpoint 104 and other portions of the network 102. The signaling tunnels 108 between the network endpoint 104 and the signaling server 106 are logical connections which carry signaling for communications through the digital communication network 102, as opposed to bearer channels which carry the actual payload information to be transported through the network 102.

A first 110 of the signaling tunnels 108 is defined by a first network address of the network endpoint 104 and a second network address for the signaling server 106. Other signaling tunnels 108 between the network endpoint 104 and the signaling server 106 are specified by other addresses also associated with the network endpoint 104 and the signaling server 106.

In the embodiment of FIG. 2, the network endpoint 104 is configured to aggregate signaling associated exclusively with a customer over the first signaling tunnel 110. Also, the signaling server 106 is configured to associate the customer with the first signaling tunnel 110.

Figure 3:
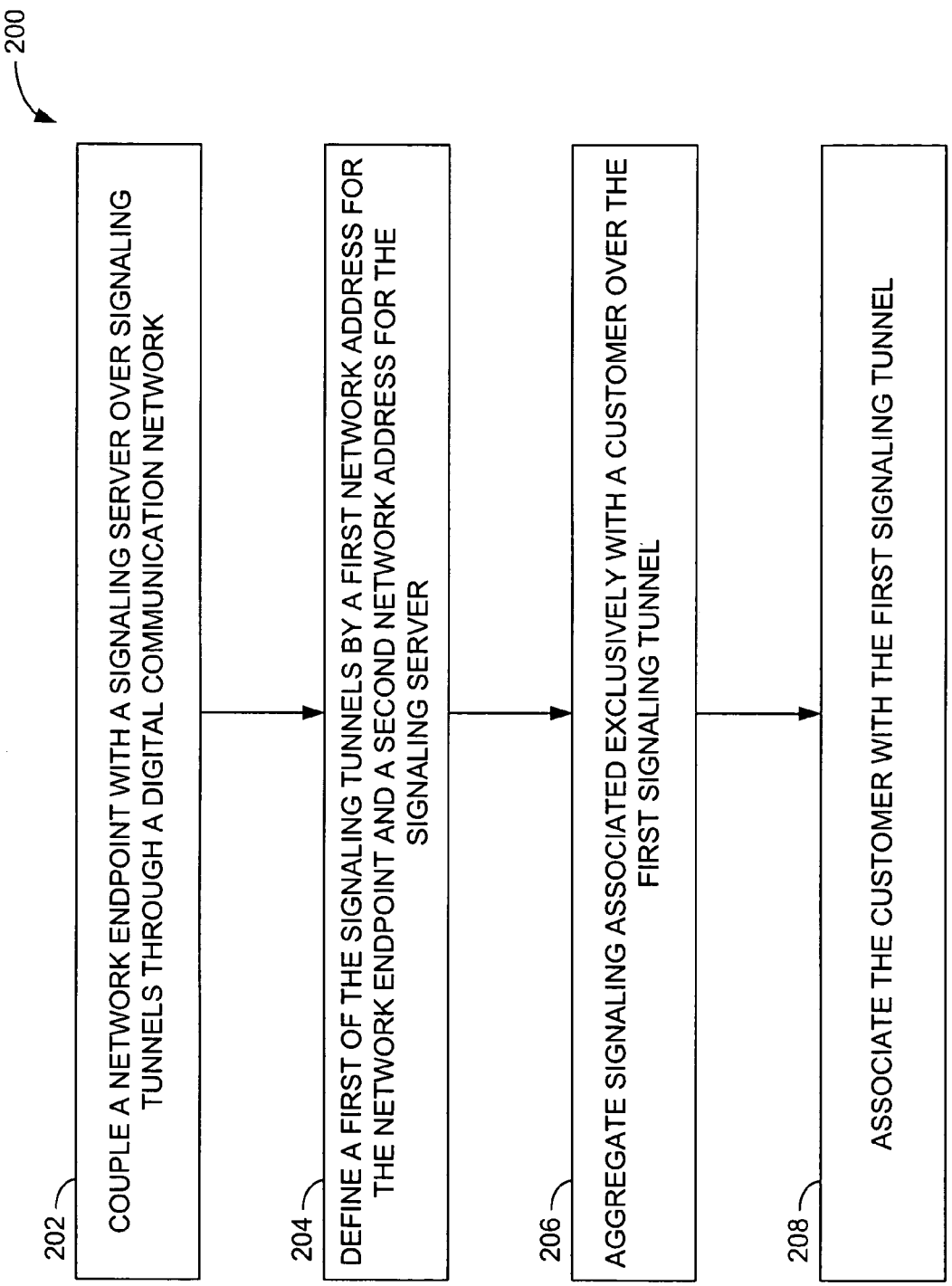
FIG. 3 is a flow diagram of a method for identifying a customer of a digital communication network according to an embodiment of the invention.

Another embodiment shown in FIG. 3, a method 200 for identifying a customer of a digital communication network, includes coupling a network endpoint with a signaling server over signaling tunnels through the digital communication network (operation 202). A first of the signaling tunnels is defined by a first network address for the network endpoint and a second network address for the signaling server (operation 204). Signaling associated exclusively with a customer is aggregated over the first signaling tunnel (operation 206). The customer is then associated with the first signaling tunnel (operation 208).

Figure 4:
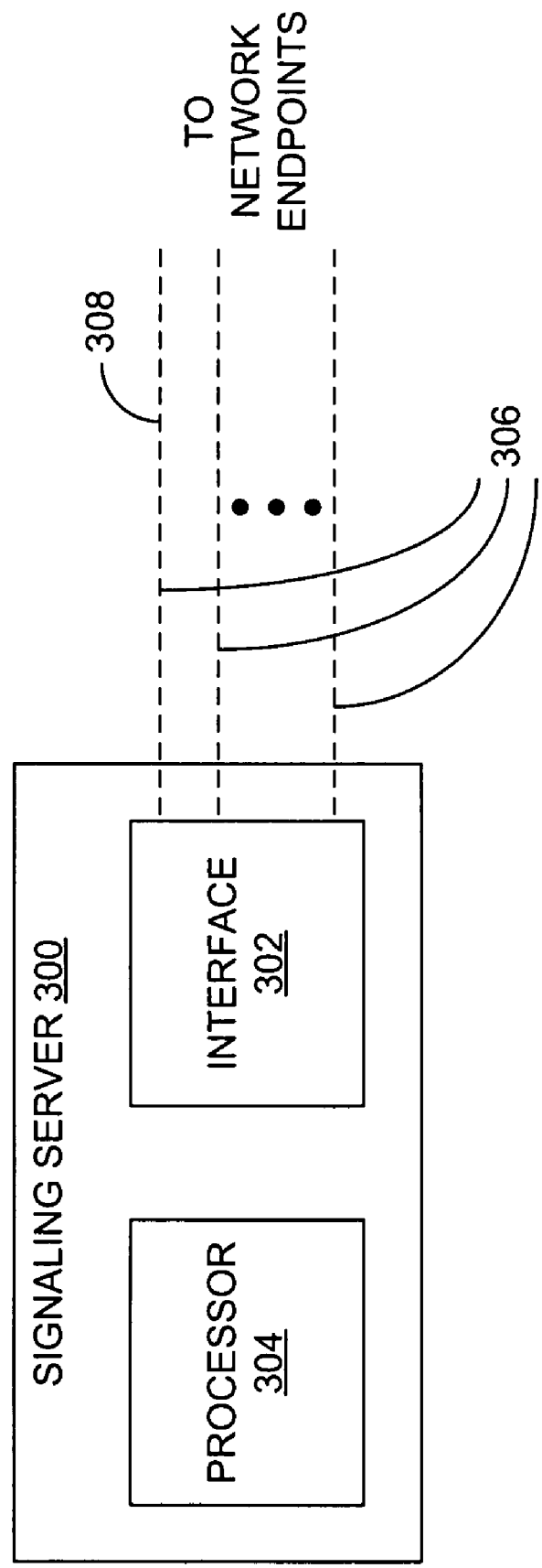
FIG. 4 is a simplified block diagram of a signaling server of a digital communication network according to an embodiment of the invention.

Another embodiment, a signaling server 300 for a digital communication network, is illustrated in FIG. 4. The signaling server 300 includes an interface 302 configured to couple the signaling server 300 with a network endpoint (not shown in FIG. 4) via signaling tunnels 306, wherein a first 308 of the signaling tunnels 306 is defined by a first network address for the network endpoint and a second network address for the signaling server 300. The network endpoint is configured to aggregate signaling associated exclusively with a customer over the first signaling tunnel 308. Also provided is a processor 304 configured to associate the customer with the first signaling tunnel 308.

Figure 5:
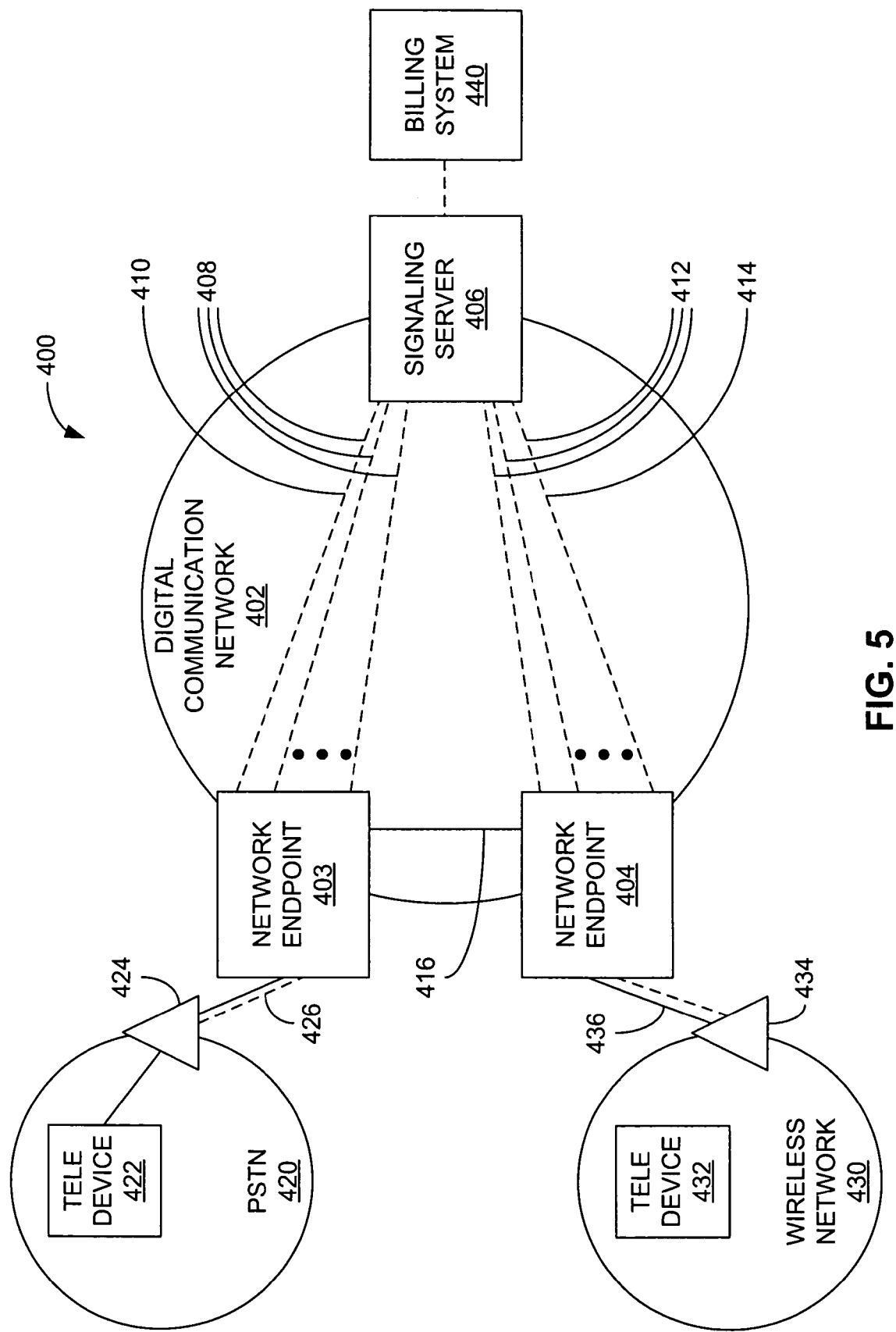
FIG. 5 is a simplified block diagram of a communication system including a digital communication network according to another embodiment of the invention.

FIG. 5 provides another embodiment of a communications system 400, which includes a digital communication network 402. In one embodiment, the digital communication network 402 is an IP network operating as a VoIP network. The digital communication network 402 includes a first network endpoint 403, a second network endpoint 404, and a signaling server 406. A greater number of network endpoints may be employed within the digital communication network 402, but are not shown to present a clear description of the embodiment. In one embodiment, each of the network endpoints 403, 404 and the signaling server 406 may include a softswitch or a media gateway controller. Also included in the endpoints 403, 404 may be a media gateway for facilitating a connection between a telephonic device and the digital communication network 402. The network endpoints 403, 404 each provide a point of presence for one or more customers for sending and receiving communications via the digital communication network 402. The signaling server 406 is operatively coupled with the network endpoints 403, 404 by way of signaling to allow and control the communications.

The signaling may include commands from the network endpoints 403, 404 to register telephonic devices with the signaling server 406 for later engagement with communications over the network 402. The network endpoints 403, 404 and the signaling server 406 may also send various messages for initiating communication, for inviting a telephonic device to engage in communication, for termination of communication, and the like. In one embodiment, the signaling between the network endpoints 403, 404 and the signaling server 406 conforms to the Session Initiation Protocol (SIP) employed in many VoIP systems. Other signaling protocols may be employed to similar end in other embodiments.

Continuing with FIG. 5, the first network endpoint 403 is coupled with the signaling server 406 by way of a first group of signaling tunnels 408, while the second network endpoint 404 is coupled with the signaling server 406 via a second group of signaling tunnels 412. Each signaling tunnel 408, 412 is identified by way of a network address of one of the network endpoints 403, 404 and a network address of the signaling server 406. Each signaling tunnel 408, 412 may be employed to encapsulate and transfer a signaling command, as described above, between the endpoints 403, 404 and the signaling server 406. Also, each tunnel 408, 412 is typically a logical connection between a network endpoint 403, 404 and the signaling server 406, as opposed to a dedicated, hardwired circuit.

Coupling the first network endpoint 403 and the second network endpoint 404 is a bearer channel 416 for transferring the actual communications payload between the endpoints 403, 404. In one embodiment, the bearer channel 416 is a tunnel, as described above, thus providing a logical connection across the digital communication network 402 between the endpoints 403, 404.

The various signaling tunnels 408, 412, the bearer channel 416, as well as other connections through the digital communication network 402, may be implemented by a variety of devices, such as IP routers and other communications equipment typically associated with an IP-based network.

Outside the digital communication network 402, the first network endpoint 403 is coupled with a first telephonic device 422 by way of a first switch 424. Similarly, the second network endpoint 404 is coupled with a second telephonic device 432 via a second switch 434. Also, a first connection 426 couples the first switch 424 and the first network endpoint 403, while a second connection 436 couples the second switch 434 with the second network endpoint 404. In one embodiment, the first connection 426 and the second connection 436 are TDM connections carrying communications being transferred to and from the digital communication network 402, as well as signaling associated with the communications. Other networks, such as other digital communication networks or collections of telephonic devices, may be coupled with either of the network endpoints 403, 404 to access the digital communication network 402.

In the example of FIG. 5, the first telephonic device 422 resides within a PSTN 420, while the second telephonic device 432 resides within a wireless telephone network 430. The first telephonic device 422 may thus be a standard wireline telephone, while the second telephonic device 432 may be a cell phone. Other types of telephonic devices may be employed in this or other implementations. Also, each of the networks 420, 430 may typically service hundreds or thousands of telephonic devices in addition to those specifically depicted in FIG. 5. In other embodiments, the network 420, 430 may be a lesser number of telephonic devices coupled with the first network endpoint 403 or the second network endpoint 404 by way of a private branch exchange (PBX) or similar device.

Coupled with the signaling server 406 is a billing system 440 for billing customers that utilize the digital communication network 402. The billing system 440 may include a single computer system, a collection of interconnected computer systems, or any other digital processing arrangement capable of generating bills for the customers.

In handling the various signaling necessary to allow and control communications across the digital communication network 402, the first network endpoint 403 is configured to aggregate signaling associated exclusively with a first customer over a first signaling tunnel 410 of the first group of signaling tunnels 408. In situations in which the first signaling tunnel 410 possesses the capacity to handle a significant number of telephone calls simultaneously across the network 402, institutional customers, such as large corporations, may be particularly well-suited for application of the embodiments described herein. In some cases, a large customer may be associated with two or more of the first group of signaling tunnels 408 to accommodate large call volumes involving the customer. In like fashion, the second network endpoint 404 may aggregate signaling associated with the first customer, or another customer, over a second signaling tunnel 414 of the second group of signaling tunnels 412. In one embodiment, as other telephonic devices associated with additional customers may be coupled with one or both of the network endpoints 403, 404, each of the other signaling tunnels 408, 412 may be associated exclusively with one of these additional customers.

Given the aggregation of the signaling associated with the first customer onto the first signaling tunnel 410, the signaling server 406 may be configured to associate the first customer with the first signaling tunnel 410. Such an association may protect the customer from attacks associated with the customer's use of the digital communication network 402. For example, theft of service attacks may be reduced, since any additional signaling taking place over a signaling tunnel 408, 412 other than the first signaling tunnel 410 may be identified as not being associated with the first customer, regardless of any addresses that may be "spoofed," or faked, within the additional signaling.

In addition to associating the first customer with the first signaling tunnel 410, other signaling associated with the first and other customers that has been aggregated onto other signaling tunnels 408, 412 may allow association of the respective customers with their corresponding tunnels 408, 412 as well.

A service provider supporting the digital communication network 402 may benefit from this association. In one embodiment, the signaling server 406 may provide billing information to the billing system 440 based on the association. For example, presuming the signaling server 406 has set up a telephone call over the bearer channel 416 and the network endpoints 403, 404 between the first telephonic device 422 and the second telephonic device 432, the signaling server 406 may be cognizant of the association of the first customer with the first telephonic device 422 by way of the signaling between the first network endpoint 403 and the signaling server 406 occurring over the first signaling tunnel 410. As a result, the signaling server 406 may also be configured to provide an identification of the first customer in conjunction with the telephone call to the billing system 440. Also, the second network endpoint 404 may be aggregating signaling related to a second customer associated with the second telephonic device 432 over the second signaling tunnel 414, thus allowing the signaling server 406 to associate the opposing end of the telephone call with the second customer, and therefore identifying the second customer associated with the telephone call to the billing system 440.

In one embodiment, the information being provided to the billing system 440 is presented in the form of a call data record (CDR) directly indicating the identity of the first (and possibly second) customer. In another implementation, the signaling server 406 may instead supply an identifier for the first signaling tunnel 410, such as a "tunnel name" or "trunk name" associated with the first signaling tunnel 410, by which the billing system 440 could discern the identify of the customer.

In addition, as a result of the signaling occurring in conjunction with the telephone call, the signaling server 406 may provide other information pertinent to any billing associated with the call. In one embodiment, this additional information may include, but is not limited to, the duration of the call and the bandwidth allocated to the call.

Based on the identity of the first, and possibly second, customer associated with the telephone call, the signaling server 406 may also generate a rate plan for use by the billing system 440 based on the customers identified with the telephone call. For example, the first customer may be required to pay the entire cost of the telephone call, based on a previous arrangement with the service provider supporting the digital communication network 402, and on various circumstances surrounding the call. One rate may apply for calls originating from the first customer, while inbound calls to the customer may indicate a different rate. Also, the identity of the second customer, if known by the signaling server 406, may also affect the amount paid by the first customer. Also, the cost of the call may be paid entirely by one customer or the other, or may be split in some fashion between the two customers, depending on the identity of the customers involved in the call.

The aggregation of signaling over the first signaling tunnel 410 associated with the first customer may also allow the signaling server 406 to set a particular traffic capacity for the first customer over the first signaling tunnel 410. For example, the signaling server 406 may set a maximum number of simultaneous calls allocated to the customer that can be controlled over the first signaling tunnel 410. Such allocation of capacity among customers may benefit both the customer and service provider, as the customer may be guaranteed that level of capacity for traffic over the digital communication network 402, while the service provider is able to apportion the bandwidth available across the network 402 via such a mechanism according to customer size, rate plans, and other factors.

Continuing with FIG. 5, the aggregation by the first network endpoint 403 of signaling over the first signaling tunnel 410 for telephone calls identified with a particular customer may be performed by way of a phone number associated with the telephonic device 422. In one embodiment, the first network endpoint 403 aggregates the signaling by determining the identity of the telephonic device 422 via automatic number identification (ANI). In one particular example, the entire phone number may be compared against a database supplied by the customer to determine if the telephonic device 422 is associated with the customer. In another implementation, the prefix, area code, or the "information digits" portion of the ANI may be employed to perform the aggregation.

Figure 6:
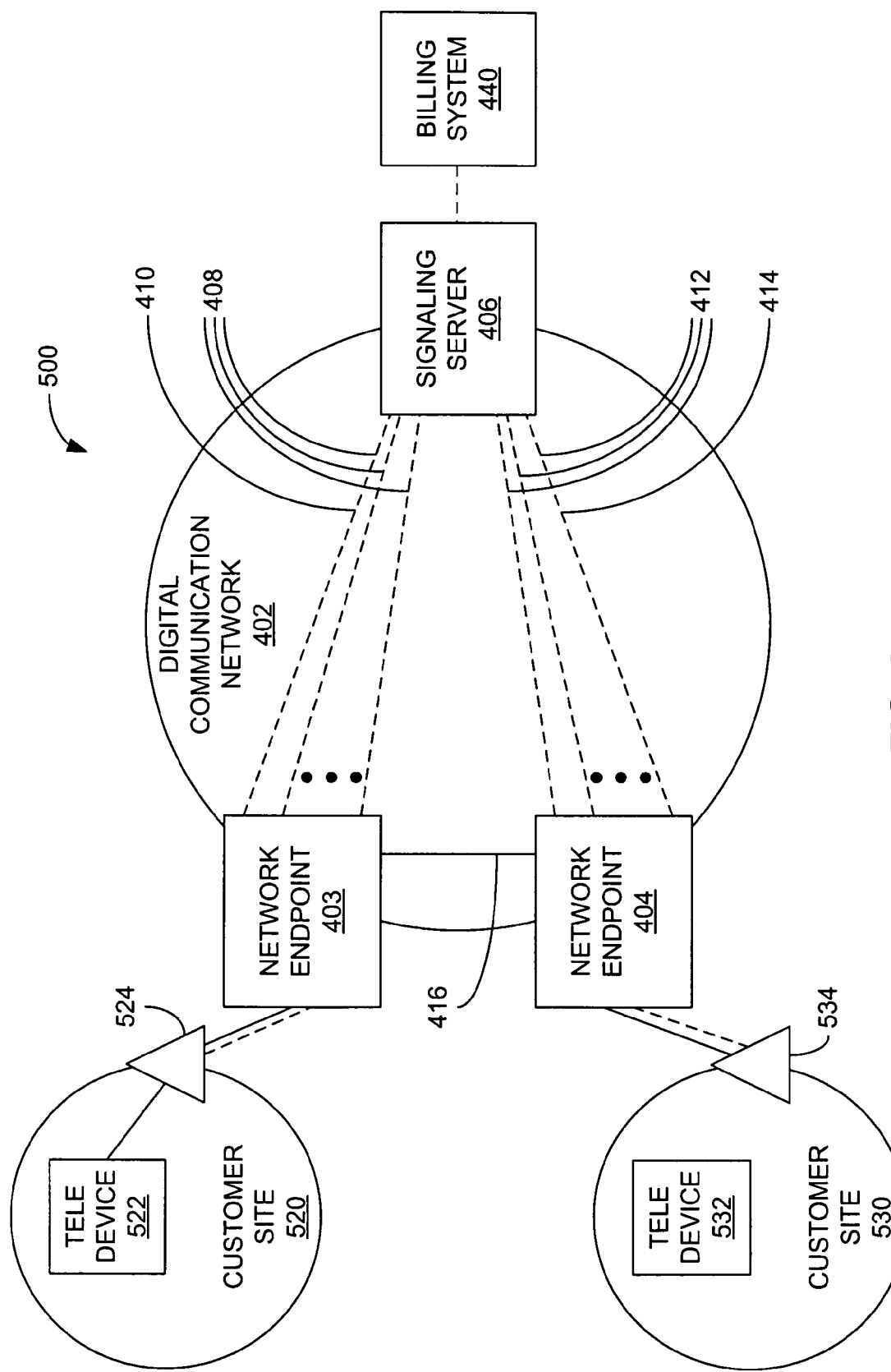
FIG. 6 is a simplified block diagram of another communication system including a digital communication network according to another embodiment of the invention.

FIG. 6 is a block diagram of another embodiment of a communication system 500 employing the digital communication network 402 discussed above in conjunction with FIG. 5. However, in this particular example, the first network endpoint 403 is coupled via a switch 524 to a first telephonic device 522 residing at a first customer site 520. Similarly, the second network endpoint 404 is coupled through a switch 534 to a telephonic device 532 located at a second customer site 530. Under this scenario, the first network endpoints 403 may aggregate signaling associated with the first telephonic device 522, as well as any other telephonic device at the customer site 520, with the customer associated with the site 520, by way of identifying any traffic being received from the switch 524 with the customer. In one example, the switch 524 may be coupled with a particular port of the first network endpoint 403, allowing the first network endpoint 403 to aggregate any traffic received by way of the port over the first signaling tunnel 410. The same is true regarding the second network endpoint 404 and the second customer site 530. In one example, the customer sites 520, 530 are associated with the same customer, thus allowing a measure of security for communications between the sites 520, 530, as described above.

In reference to FIG. 6, the first network endpoint 403 and/or the second network endpoint 404 may be located remotely from the first customer site 520 and/or the second customer site 530, respectively. In other implementations, one or both of the network endpoints 403, 404 may be located on the associated customer site 520, 530, especially if the customer site 520, 530 is associated with a large number of telephonic devices 522, 532.

With respect to any of the embodiments disclosed herein, a network endpoint may take any of several different forms, depending upon the nature of the equipment to which the network endpoint is attached. For example, if the network endpoint receives SIP signaling from a switch or an IP phone, the network endpoint may be a router configured to encapsulate the signaling for transfer over the selected signaling tunnel. In another implementation, the network endpoint may receive PSTN signaling, such as that associated with Signaling System 7 (SS7), and then transform the signaling to SIP or another protocol associated with VoIP. In yet another scenario, the network endpoint may itself be an IP phone capable of providing the necessary signaling for transfer over the digital communication network.

While several embodiments of the invention have been discussed herein, other embodiments encompassed within the scope of the invention are possible. For example, while particular mention has been made of telephonic devices for conducting voice communications, other forms of communication, such as video, audio, and data communications, may also benefit from various embodiments. In addition, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. A communication system, comprising:
   a digital communication network comprising a first network endpoint, a second network endpoint, and a signaling server, wherein the first network endpoint is coupled with the signaling server over a first signaling tunnel through the digital communication network and the second network endpoint is coupled with the signaling server over a second signaling tunnel through the digital communication network;
   a billing system in communication with the signaling server;
   wherein the first signaling tunnel is defined by a first network address for the first network endpoint and a second network address for the signaling server;
   wherein the first network endpoint is configured to aggregate signaling associated exclusively with a customer over the first signaling tunnel;
   wherein the signaling server is configured to associate the customer with the first signaling tunnel;
   wherein the signaling server is configured to set up, via the first and second signaling tunnels, a telephone call between the first and second network endpoints over a bearer channel through the digital communication network; and
   wherein the signaling server is configured to provide an identification of the customer with the telephone call to the billing system, wherein the identification of the customer comprises a call data record comprising an identification of the first signaling tunnel.

2. The communication system of claim 1, wherein the digital communication network comprises a Voice over Internet Protocol network.

3. The communication system of claim 1, wherein each of the first network endpoint and the signaling server comprises one of a softswitch and a media gateway controller.

4. The communication system of claim 1, wherein the signaling conforms to a Session Initiation Protocol.

5. The communication system of claim 1, wherein the signaling server is further configured to provide at least one of a duration and a bandwidth of the telephone call to the billing system.

6. The communication system of claim 1, wherein the first network endpoint comprises one of an originating end and a terminating end of the telephone call.

7. The communication system of claim 1, wherein the customer is also associated with the second signaling tunnel.

8. The communication system of claim 1, wherein the signaling server is further configured to generate a rate plan based upon the first and second signaling tunnels.

9. The communication system of claim 1, wherein the signaling server is further configured to set a traffic capacity for the first signaling tunnel.

10. The communication system of claim 9, wherein the traffic capacity comprises a number of simultaneous calls.

11. A signaling server for a digital communication network, the signaling server comprising:
    an interface configured to couple the signaling server with a first network endpoint over a first signaling tunnel through the digital communication network and to couple the signaling server with a second network endpoint over a second signaling tunnel through the digital communication network, wherein the first signaling tunnel is defined by a first network address for the first network endpoint and a second network address for the signaling server, and wherein the first network endpoint is configured to aggregate signaling associated exclusively with a customer over the first signaling tunnel; and
    a processor configured to associate the customer with the first signaling tunnel and to set up, via the first and second signaling tunnels, a telephone call over a bearer channel of the digital communication network between the first network endpoint and the second network endpoint, and to provide an identification of the customer with the telephone call to a billing system, wherein the identification of the customer comprises a call data record comprising an identification of the first signaling tunnel.

12. The signaling server of claim 11, wherein the digital communication network comprises a Voice over Internet Protocol network.

13. The signaling server of claim 11, wherein the signaling conforms to a Session Initiation Protocol.

14. The signaling server of claim 11, wherein the processor is further configured to provide at least one of a duration and a bandwidth of the telephone call to the billing system.

15. The signaling server of claim 11, wherein the customer is also associated with the second signaling tunnel.

16. The signaling server of claim 11, wherein the processor is further configured to generate a rate plan based upon the first and second signaling tunnels.

17. The signaling server of claim 11, wherein the processor is further configured to set a traffic capacity for the first signaling tunnel.

18. The signaling server of claim 17, wherein the traffic capacity comprises a number of simultaneous calls.

19. A method for identifying a customer of a digital communication network, the method comprising:
 coupling a first network endpoint with a signaling server over a first signaling tunnel through the digital communication network;
 coupling a second network endpoint with the signaling server over a second signaling tunnel through the digital communication network;
 defining the first signaling tunnel by a first network address for the first network endpoint and a second network address for the signaling server;
 aggregating signaling associated exclusively with a customer over the first signaling tunnel;
 associating the customer with the first signaling tunnel;
 setting up, via the first and second signaling tunnels, a telephone call over a bearer channel through the digital communication network between the first and second network endpoints; and
 providing an identification of the customer with the telephone call to a billing system, wherein providing the identification of the customer comprises providing a call data record comprising an identification of the first signaling tunnel.

20. The method of claim 19, wherein the digital communication network comprises a Voice over Internet Protocol network.

21. The method of claim 19, wherein the signaling conforms to a Session Initiation Protocol.

22. The method of claim 19, further comprising providing at least one of a duration and a bandwidth of the telephone call to the billing system.

23. The method of claim 19, wherein the first network endpoint comprises one of an originating end and a terminating end of the telephone call.

24. The method of claim 19, wherein the customer is also associated with the second signaling tunnel.

25. The method of claim 19, further comprising generating a rate plan based upon the first signaling tunnel and the second signaling tunnel.

26. The method of claim 19, further comprising setting a traffic capacity for the first signaling tunnel.

27. The method of claim 26, wherein the traffic capacity comprises a number of simultaneous calls.

28. A storage medium comprising instructions executable on a processor for employing the method of claim 19.

* * * * *